United States Patent [19]
Zecchetto et al.

[11] Patent Number: 5,820,537
[45] Date of Patent: Oct. 13, 1998

[54] TOOL CHANGING DEVICE FOR MACHINE TOOL

[75] Inventors: Luigi Zecchetto; Zeno Borsaro; Andrea Riello, all of Minerbe, Italy

[73] Assignee: Riello Macchine Utensili SpA, Minerbe, Italy

[21] Appl. No.: 810,927

[22] Filed: Mar. 5, 1997

[30] Foreign Application Priority Data

Mar. 8, 1996 [IT] Italy .................................. MI96A0449

[51] Int. Cl.$^6$ .................................................. B23Q 3/157
[52] U.S. Cl. .................................................. 483/55; 29/40
[58] Field of Search .................................. 483/55, 56, 57, 483/30, 24; 29/40, 39, 38; 408/35

[56] References Cited

U.S. PATENT DOCUMENTS

| | | |
|---|---|---|
| 3,023,677 | 3/1962 | Charlat . |
| 4,608,747 | 9/1986 | Link et al. . |
| 4,819,311 | 4/1989 | Hashimoto et al. . |
| 5,146,663 | 9/1992 | Buessinger .................................. 29/40 |
| 5,383,261 | 1/1995 | Yamamoto et al. .................... 29/40 |
| 5,455,993 | 10/1995 | Link et al. ............................... 408/35 X |

FOREIGN PATENT DOCUMENTS

2 704 789 A 11/1994 France .

*Primary Examiner*—William R. Briggs
*Attorney, Agent, or Firm*—Helfgott & Karas, P.C.

[57] ABSTRACT

For the change of tools of machine tool operating units, a device is provided which comprises a tool-holder support or carriage (144,204) on which there are mounted at least two tool-holder spindles (48,148) with a corresponding tool (50,150), and the axis of at least one of these at least two tool-holder spindles is inclined at a predetermined angle relative to the axis of the spindle (10,110) of the operating unit. Means controlled by the spindle (10,110) of the operating unit pivot this support or carriage (44,204) and the corresponding at least one tool-holder spindle (48,148) by this predetermined angle, in order to position the required tool-holder in axial alignment with this spindle (10,110). In order to activate the support or carriage a tie rod mechanism (62,64,162,164) is provided which can be displaced axially such as to disengage a pair of ring gears with frontal toothing of the Hirth type (26,57,126,157) and simultaneously to activate a mechanical or pneumatic control for displacement of this support or carriage by this angle for the change of tool-holder and corresponding tool.

19 Claims, 9 Drawing Sheets

TOOL CHANGING DEVICE FOR MACHINE TOOL

The present invention relates to machine tool operating units, and more specifically to an improved device for changes of tool of such units.

Operating unit, in accordance with the most general sense, means an assembly which is driven autonomously and is provided with means for mounting a mechanical processing tool at the end of a spindle, as well as means for controlling the gradual advance and withdrawal of the spindle, and therefore the tool together with it.

These operating units are used prevalently within the context of machine tools which are provided with a plurality of mechanical processing stations, such that a workpiece which is being processed is subjected in ordered succession to several mechanical processing operations.

In modern machine tools, there is normally provided a central turntable which supports and transfers the parts which are being processed, submitting them to the action of the mechanical processing tools, and the latter are integral with corresponding operating units which project towards the turntable.

It will be appreciated that as the number of individual mechanical processing operations increases, and thus the number of operating units, significant problems arise of functional accommodation of the operating units in the structure which defines the cell in which the turntable is mounted, as well as of mutual interference between adjacent operating units.

In addition, in most cases, a single operating unit can be used for several processing operations, provided obviously that the tool which is mounted on the corresponding spindle is replaced.

Of course, as it is not rationally feasible to replace the tool during the course of the processing operation, hitherto use has been made of revolver heads provided with a plurality of spindles, so that according to the processing operation required, to which there corresponds an ordered succession of interventions of different tools mounted on respective tool-holder spindles of the revolver head, the individual tool-holder spindles must be brought in succession into the operating position. The latter are activated by kinematic motion transmission chains, optionally with reduction gears interposed, starting from the operating unit spindle.

It is apparent that this solution increases significantly the complexity and cost of the machine, and also makes simple maintenance more difficult and costly. Additionally, the size of the operating unit and the revolver head need to be large, and moreover it is difficult to ensure both perfect coaxiality of the various spindles, and phasing with the pivoting of the operating unit spindle, the latter being a condition which is necessary for accuracy of the processing operation.

A further problem which has not been solved hitherto in the above-described type of machine tools is that of execution of processing operations with tools which have parallel axes (for example when, according to the features of the part being processed, tools with different types of performance are required), since the lack of space for accommodation of two spindles can be eliminated only by adopting operating units with very extended work paths, and thus giving rise to problems on the units themselves.

On the other hand technical solutions are not known according to which the tool is replaced directly on the spindle of the operating unit, within the context of an operating cycle in which each operating unit carries out several functions and therefore several mechanical processing operations.

The main object of the present invention is to solve in an industrially advantageous manner the problems and disadvantages described briefly above.

More specifically, the main object of the present invention is to provide an improved device which makes it possible to change two or more tools directly on the spindle of an operating unit.

A further object of the present invention is to provide a device for change of tools which has a small size, is highly accurate, and in which the tool change does not affect the times of the machine tool processing cycle.

These and other objects of the present invention are achieved by means of a device for change of tools of operating units which is substantially characterised in that it comprises a support or carriage on which there are mounted at least two tool-holders with a corresponding tool associated, the axis of at least one of these at least two tool-holders being inclined at a pre-determined angle relative to the axis of the spindle of the operating unit, means controlled by the spindle of the operating unit in order to pivot a tool-holder selected from amongst these at least two tool-holders by this predetermined angle, in order to bring the latter into alignment with the axis of this spindle of the operating unit, and engagement and disengagement means which can be activated from this operating unit, in order to start and stop transmission of the pivoting motion between the spindle of the operating unit and the tool-holder which is aligned with its axis.

According to the preferred embodiment of the present invention, these engagement and disengagement means consist of a pair of ring gears with frontal toothing provided at the top of a reduction gear which is integral with this spindle of the operating unit, and at the base of each of the at least two tool-holders, as well as of a tie rod which is aligned axially with this reduction gear and thus with the axis of the spindle of this operating unit, and has a first end which is integral with the spindle of the operating unit and the other, outer end is accommodated in a correspondingly profiled recess provided in the base of each of these at least two tool-holders, this recess extending parallel to the arc which must be described and travelled by each of the at least two tool-holders in order to go into the position aligned with the axis of the spindle of the operating unit, the tie rod being mobile axially such as to displace correspondingly the base of the at least two tool-holder spindles instantaneously into a position aligned with the axis of the spindle of the operating unit, between a condition of mutual engagement of the two frontal toothing ring gears and a disengagement condition.

Taking into consideration a first preferred embodiment of the present invention, the at least two tool-holders, of which there are preferably four, are mounted on a frusto-conical support which pivots around an axis which is inclined by a predetermined angle relative to the axis of the spindle of the operating unit, this angle being such that the pivoting of the pivoting support brings each of the tool-holders in succession into alignment with the axis of the spindle of the operating unit.

According to a second embodiment of the invention, the at least two tool-holders are mounted on an oscillating motion carriage in a plane which passes through the axis of the spindle of the operating unit, the carriage being mobile in the oscillating motion between two symmetrical end positions relative to the axis of the spindle of the operating unit, with a number of intermediate positions corresponding to the number of tool-holders mounted on the carriage, so that the angular displacement of the carriage by the predetermined angle brings the one, which has been selected from the at least two tool-holders, into alignment with the axis of the spindle of the operating unit.

The angular displacement of the carriage can in turn be controlled by predetermined pivoting of the spindle of the operating unit by means of a kinematic motion transmission chain, or a fluidic transmission.

Substantially, the informative principle of the present invention consists in the fact that each tool-holder travels an arc of an amplitude such as to bring it into a position which is directly aligned with the axis of the spindle of the operating unit, and in this condition the pivoting motion by which the spindle of the main operating unit is driven, is transmitted in direct engagement to the tool-holder in question and thus to the tool.

The specific aspects and advantages of the present invention will become more apparent from the following description of some preferred embodiments produced in relation to the attached drawings in which.

Figure 1:
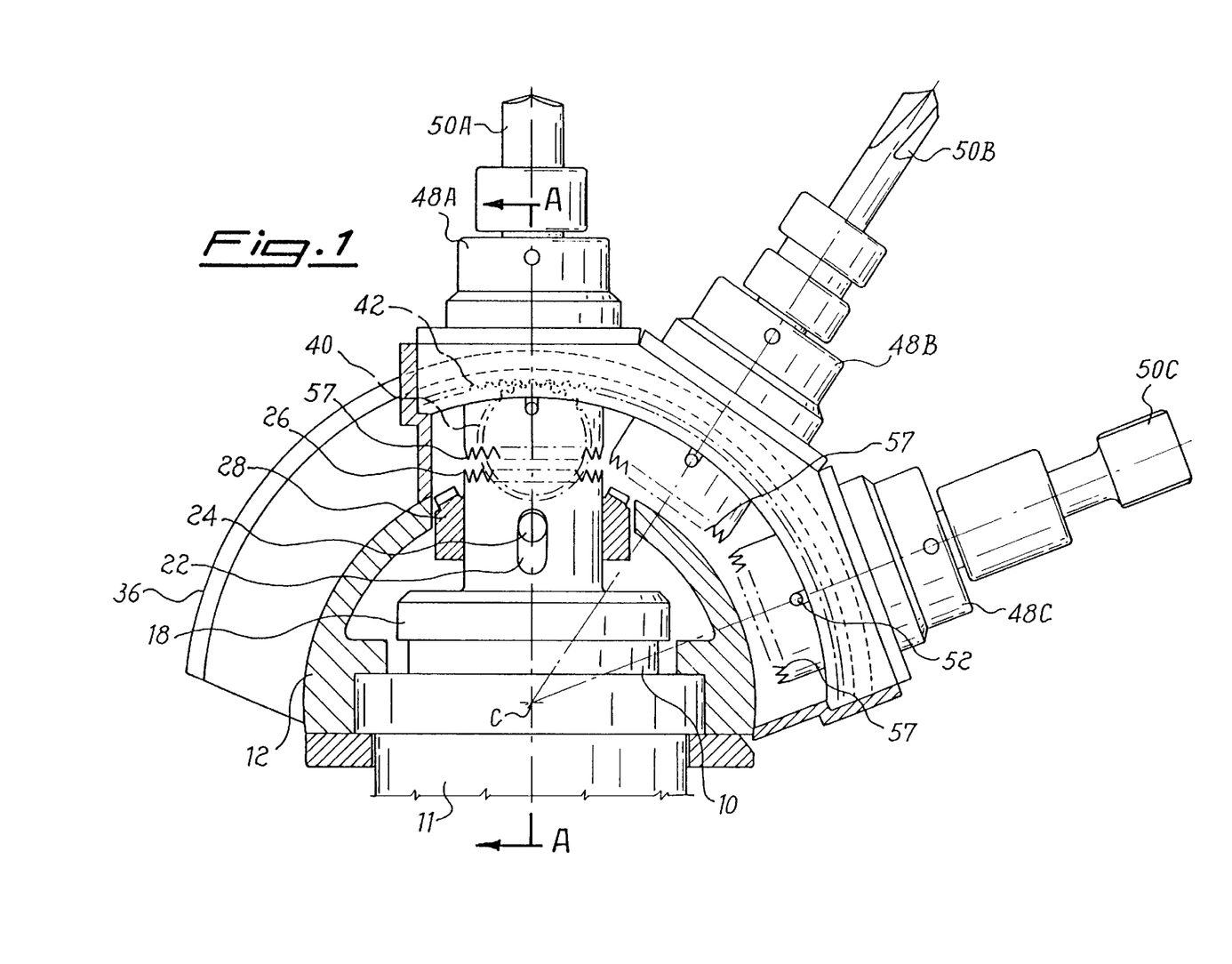
FIG. 1 is a lateral view partially in cross-section of the device for change of tools according to a first embodiment of the invention.
Figure 2:
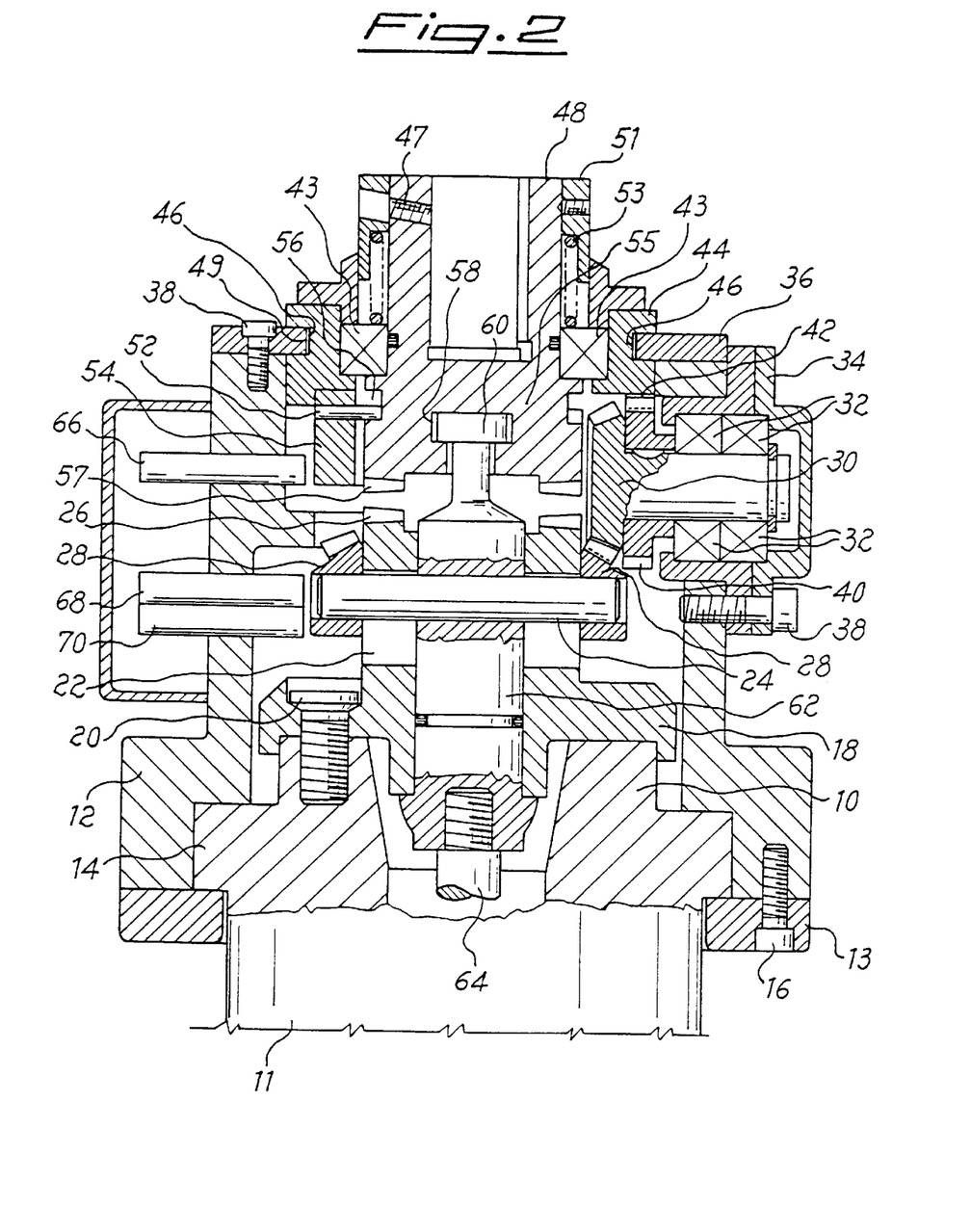
FIG. 2 is a view in cross-section according to the line A—A in FIG. 1.

FIGS. 1 and 2 in particular show an embodiment of the invention of a mechanical type, meaning that in this case the device is driven by means of a kinematic mechanism as described hereinafter.

The device for changing tools according to the invention is mounted on the end of the operating unit which is not shown and is of the conventional type (for example of the type produced and marketed by the applicant under the trade name AZ124/60CN), and comprises a socket 12 which is hollow on the interior and is rendered integral with the end of the conventional tube 11 which surrounds the spindle 10 of the operating unit, by means of the flange 14, the half-rings 13 and the screws 16.

As shown schematically in FIG. 2, the outer end of the spindle 10 ends in the conventional conical recess for fitting the tool-holder union, in which recess, in the embodiment shown, there is fitted a connecting reductor 18 which is drilled axially and is aligned with a corresponding axial aperture provided in the spindle 10.

As can be seen in FIG. 2, the reduction gear is rendered integral with the head or outer end of the spindle 10, for example by means of one or more screws 20.

In the body of the reductor 18, there is provided a longitudinal slot 22, the depth of which is at least twice the diameter of a transverse pin 24, the function of which is explained hereinafter.

The reductor 18 ends at the upper end in a ring gear 26 with frontal toothing, for example and preferably of the type known in the art as Hirth toothing.

Beneath the plane of the ring gear 26, on the reductor 18 there is mounted such as to slide but not integrally, a bevel gear 28, which is attached to the pin 24, and according to the axial position of the pin 24, can engage with a bevel pinion 30, supported for pivoting by means of bearings 32 and a flange 34, by a guide 36, which in turn is integral with the socket 12 (for example by means of screws 38).

There is integral with the pinion 30 a gear 40 which can engage with a ring gear 42 which is integral with a carriage 44 which has a profile in the shape of an arc and is destined to pivot, or rather to oscillate relative to a centre which is disposed substantially at the end of the spindle 10.

The carriage 44 is guided in its pivoting by means of the connection between peripheral slots 46 and corresponding guide rails 49 which are integral with the guide 36.

With the carriage 44 there are integral in the manner described hereinafter three tool-holders 48A, 48B and 48C, on each of which, as can be seen in FIG. 1, there is mounted a different tool 50 (A, B and C).

Each tool-holder is rendered integral with the carriage 44 by means of a pin 52 which is integral with a flange 54, amd is engaged in a corresponding opening or slot 56 provided in the lateral surface of the lower part of the body 55 of the tool-holder 48, whereas the pivoting of the tool-holder relative to the carriage 44 is made possible by bearings 43, which are however mounted with a given clearance, which provides apparent advantages. The part of the body 55 ends at the base in a ring gear 57 with frontal toothing, which can engage the ring gear 26 of the connecting reductor 18, and also in the same part of the body 55 there is provided a slot 58 in the shape of a T which is open at the base, i.e. towards the spindle 10 of the operating unit.

In the slot 58, which extends along the whole length of the carriage 44 and has the same curvature, there is disposed the head 60 of a tie rod 62 which extends downwards inside the axial aperture of the reductor 18, ending inside the conical end of the spindle 10, integral with which there is a second tie rod 64, which extends axially inside the spindle of the operating unit, where in a known manner it implements axial displacements parallel to the longitudinal axis of the spindle 10 and of the tube 11 of the operating unit.

The pin 24, which is integral with the tie rod, and moves integrally with the axial displacements of the tie rod, passes through the tie rod 62. There are also integral with the socket 12 sensors shown schematically and indicated with the references 66, 68 and 70, which have the function of indicating displacements of the flange 54 as far as the sensor 66 is concerned, and the pin 24 as far as the sensors 68 and 70 are concerned.

Finally it should be noted that the tools 50 are preferably selected such as to follow on from one another in accordance with a processing cycle to be carried out on a part to be subjected to mechanical processing which is maintained in the same position, i.e. in front of the tool-holder spindle indicated with the reference 50A in FIG. 1.

Taking into consideration the operating of the device for change of tools according to this embodiment of the invention, it is assumed that the situation is that in which the tie rod 62 is drawn by the tie rod 64 towards the conical head or end of the spindle 10, such that the ring gears 26 and 57 with frontal toothing are engaged with one another, and thus pivoting of the spindle 10 and of the reductor 18 which is integral with the latter rotary entrains the tool-holder 48.

Pivoting of the latter is also made possible in that the spindle 52 is accommodated in the upper part of the slot 56, in which position pivoting of the tool-holder 48 is not prevented by engagement of the pin.

In turn the pin 24 is displaced into its position closest to the head of the spindle 10, such that the bevel gear 28 is disengaged from the pinion 30 and thus also the gear 28 cannot pivot.

The operation of the device according to the invention for change of tools is now described with particular reference to the situation in FIGS. 1 and 2, in which the device operates by activation of the tie rod 64 such that it applies thrust towards the exterior of the tie rod 62.

Thus the ring gears 26 and 57 with Hirth toothing are disengaged, and transmission of pivoting motion from the spindle 10 to the tool-holder 48A and the tool 50A ceases.

In the meanwhile, axial displacement of the tie rod 62 gives rise to similar translation of the pin 24, and together with the latter the bevel gear 28 which engages the pinion 30, whereas axial displacement of the tool-holder 48 engages the pin 52 with the open part of the slot 56, and thus pivoting of the tool-holder 48 is safely prevented.

Pivoting of the spindle 10 by a predetermined angle gives rise to pivoting of the pinion 30, and together with the latter the gear 40, which, since it is engaged with the ring gear 42, gives rise to translation of the latter and together with the latter the carriage 44, until the tool-holder 48B is aligned with the axis of the spindle 10.

It will be appreciated that translation of the carriage 44 corresponds to an angle of approximately 120° in the case of a device with three tool-holders 48.

At this point it is sufficient to activate the tie rod 64 once again in the opposite direction, so that the tie rod 62 is drawn towards the interior in order to take the device into the already discussed condition in which it is prevented from pivoting.

The main advantages derived from the present invention are apparent from the above description of this first embodiment of the invention.

Firstly, the operating unit with the associated device for change of tools has a small size, since space must be provided only as necessary for displacement of the tool-holder between the two depicted positions, which space in this specific case is reduced to a few millimetres.

Secondly, the overall strength of the operating unit -tool assembly is greatly improved, since the tool-holder is mounted directly on the spindle of the operating unit.

Thirdly, greater accuracy of processing is obtained, since the connection between the tool-holder and spindle is by means of frontal toothing of the Hirth type, so that small clearances are automatically corrected for.

Fourthly, the short path of the tie rod and thus of the tool-holder, and the small angle which must be covered by the carriage which supports the tool-holders, ensure that the change of tool takes place very quickly, in a shorter time than that usually required for multiple mechanical processing operations.

In addition, the change device and the end of the operating unit maintain impermeability to lubricants, and in the meanwhile processing chips are prevented from infiltrating and thus affecting adversely the operation of the operating unit.

In addition to these advantages there is the significant advantage of the lower costs of carrying out processing operations with multiple tools connected in a processing cycle with change which can be controlled automatically, and the ability of using the tool-change device with any operating unit.

The embodiment depicted in FIGS. 3, 3A, 3B and 4 differs from that previously described in two main aspects, i.e. adoption of fluid pressure means for angular displacement of the tool-holder carriage between the different positions, and the presence of only two tool-holders, which aspect is associated mainly with the need to structurally and functionally simplify the change device.

For the sake of clarity of description, and in order to comply with a requirement for standardisation of description, parts which are the same as those in the embodiment already described have the same numerals.

Figure 3:
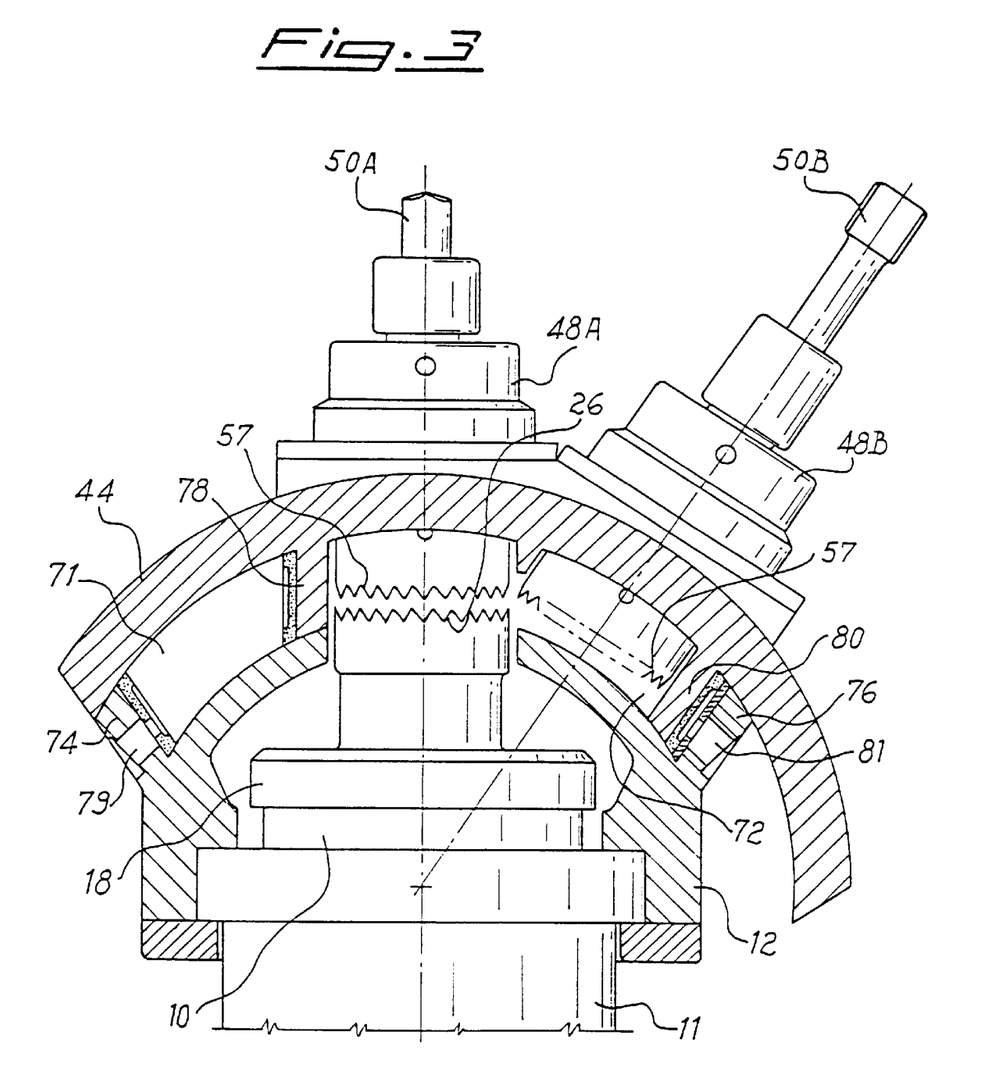
FIGS. 3 and 4 are views similar to FIGS. 1 and 2, in another embodiment of the invention.
Figure 3A:
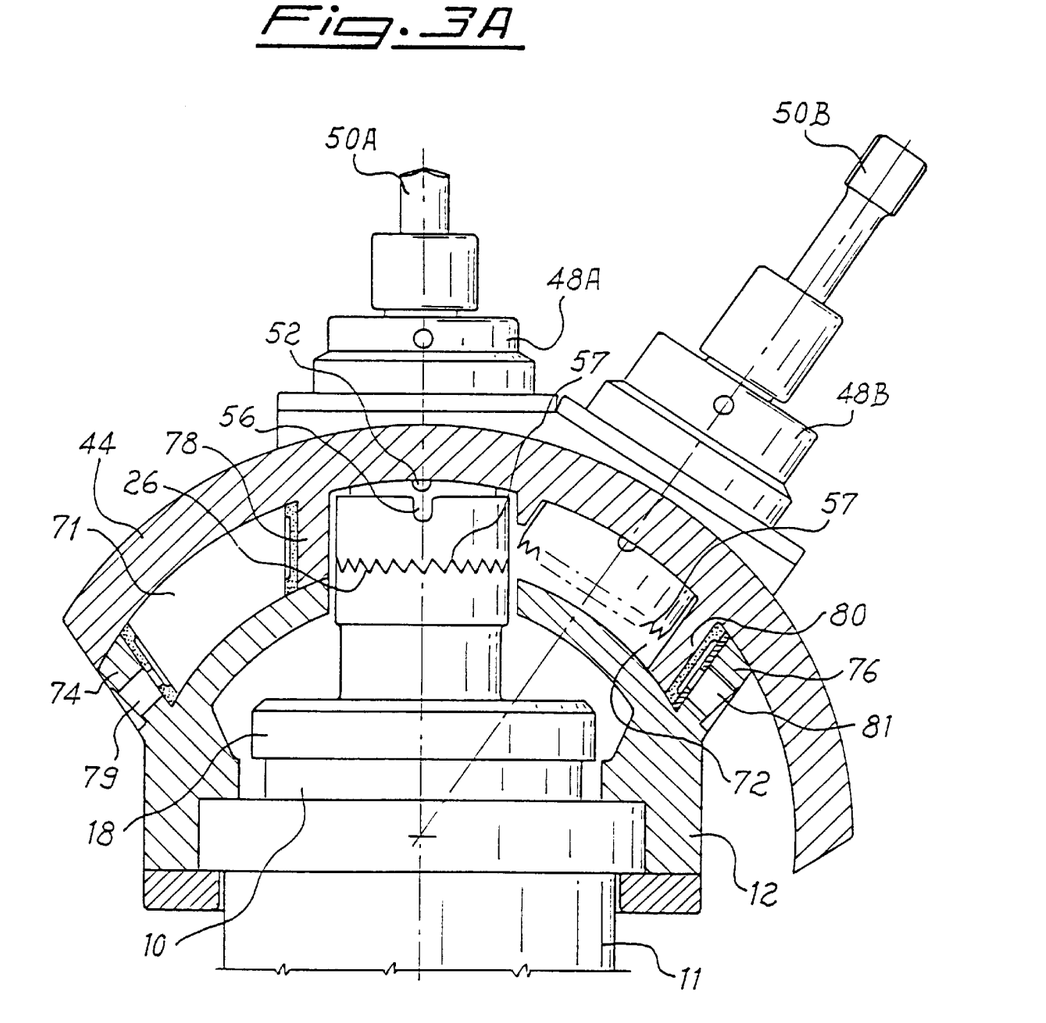
FIGS. 3A and 3B are views similar to FIG. 3, but showing the device for change of tools in different operating conditions.
Figure 3B:
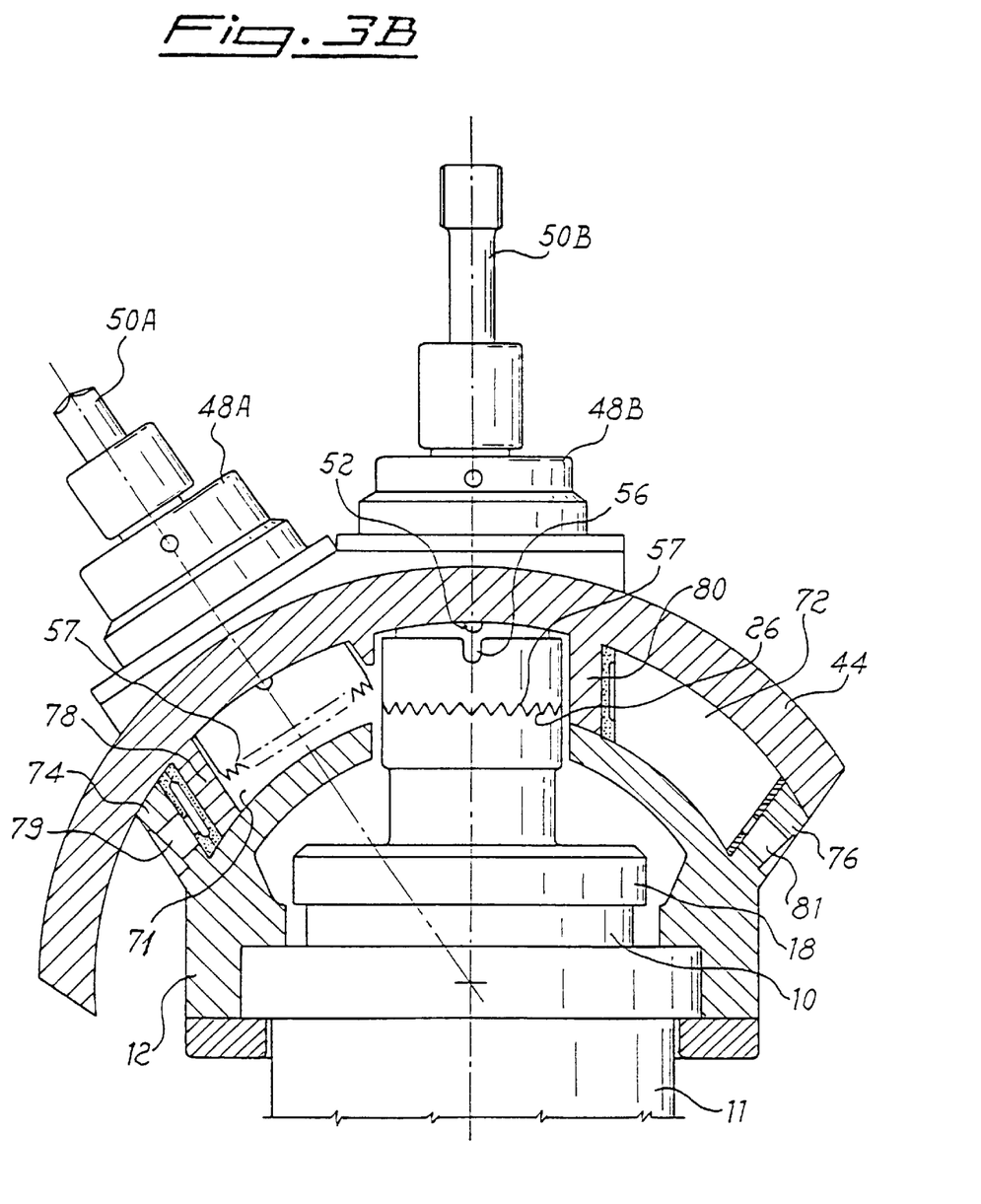

Thus in this case also, at the end of the operating unit there is mounted the socket 12, to the upper end of which there is attached the guide 36 which controls the angular displacement of the carriage 44.

Inside the socket 12 there is mounted the reductor 18, which is rendered integral with the conical end of the spindle 10 (by means of screws 20 shown in FIG. 14), which reductor has an axial aperture in which there is accommodated the same tie rod 62, which has a head 60 connected at the lower end to a second tie rod 64 which is activated axially relative to the spindle and the tube of the unit operating. The upper end of the reductor 18 is provided with a ring gear 25 with frontal toothing, preferably of the Hirth type, which can engage a similar ring gear 57 with frontal toothing which is integral with the lower end of the tool-holder 48.

Figure 4:
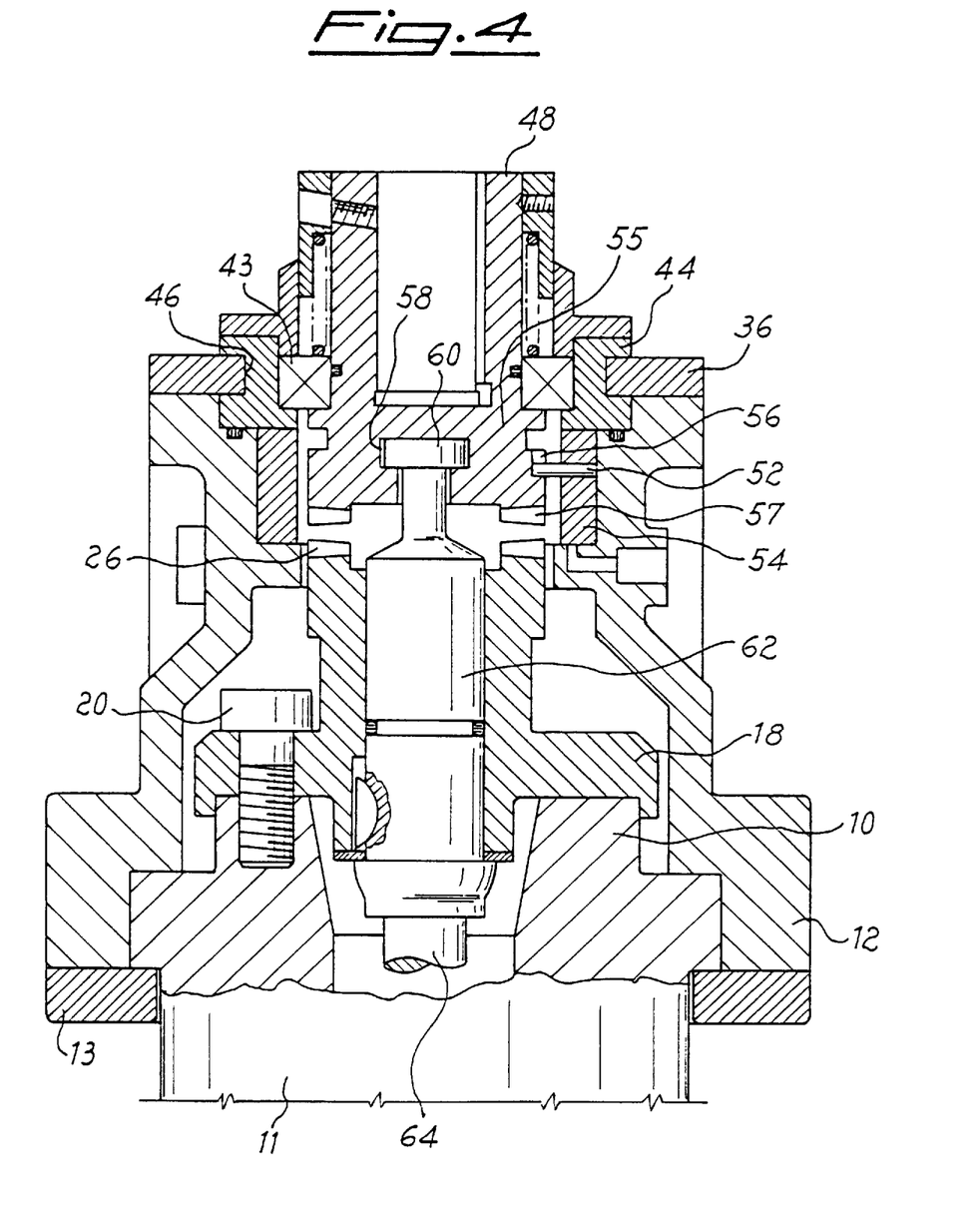

In the lower part of the tool-holder body there is a T shaped slot 58 which is open at the base, and accommodates the head 60 of the tie rod 62 which has a corresponding shape (see FIG. 4, and by analogy FIG. 2).

A pin 52 integral with a flange 54, which in turn is integral with the carriage 44, is engaged in a peripheral slot 56 provided in the outer surface of the body of the tool-holder 48, or in the other position of the tie rod 62 in a slot provided also in the body of the tool-holder 48.

As it can be appreciated in FIG. 3, between the socket 12 and the carriage 44 there is a pair of chambers 71 and 72, defined at the two ends by two fixed bulkheads 74 and 76, whereas another two bulkheads 78 and 80 are integral with the carriage 44.

Passages 79, 81 for intake and discharge of air are provided respectively in the bulkheads 74 and 76, and are connected to a source of air or another pressurised fluid, or to a discharge, according to the required function.

In the condition shown in FIG. 4, i.e. when the change of tool is to take place, by activating the tie rod 64 and thus the tie rod 62 in the direction of disengagement of the ring gear 57 from the ring gear 26, a micro-switch (not shown) is activated, in order to activate the supply of compressed air through the passage 81, so that the carriage 44 is pivoted to the left, looking at FIG. 3, until the tool-holder 48B and the corresponding tool 50B are aligned axially with the spindle 10, whereas the air present in the chamber 71 is discharged through the passage 79.

When the tool-holder 48B has reached the required position, as indicated by another micro-switch (also not shown), the supply of compressed air ceases, and in the menawhile the tie rod 64 is activated in the opposite direction, so that the Hirth ring gear 57 engages once again with the ring gear 26, restoring the operative connection between the tool 50B and the spindle 10.

In this embodiment it is preferable that the tool-holders are just two in number, so that activation for the change of tool is simplified, the tool-holder 48A simply needs to be replaced by 48B, and when the mechanical processing cycle is completed, the initial condition is restored by repeating the operation, but this time supplying the compressed air via the passage 79 and using the passage 81 as a discharge.

It should be noted that it is possible to provide devices for change of tools designed for execution of the change either by mechanical action or by pneumatic action, and thus with three or more tool-holders 48.

The objective is to fit a maximum of two tool-holders only with the corresponding tools in their seats, and to block the remainder, when this is necessitated by the applicative requirements, maintaining the possibility of activating the blocked tool-holders also in a second stage, and thus transforming the tool-change device from one which is activated pneumatically, to one which is activated mechanically.

Figure 5:
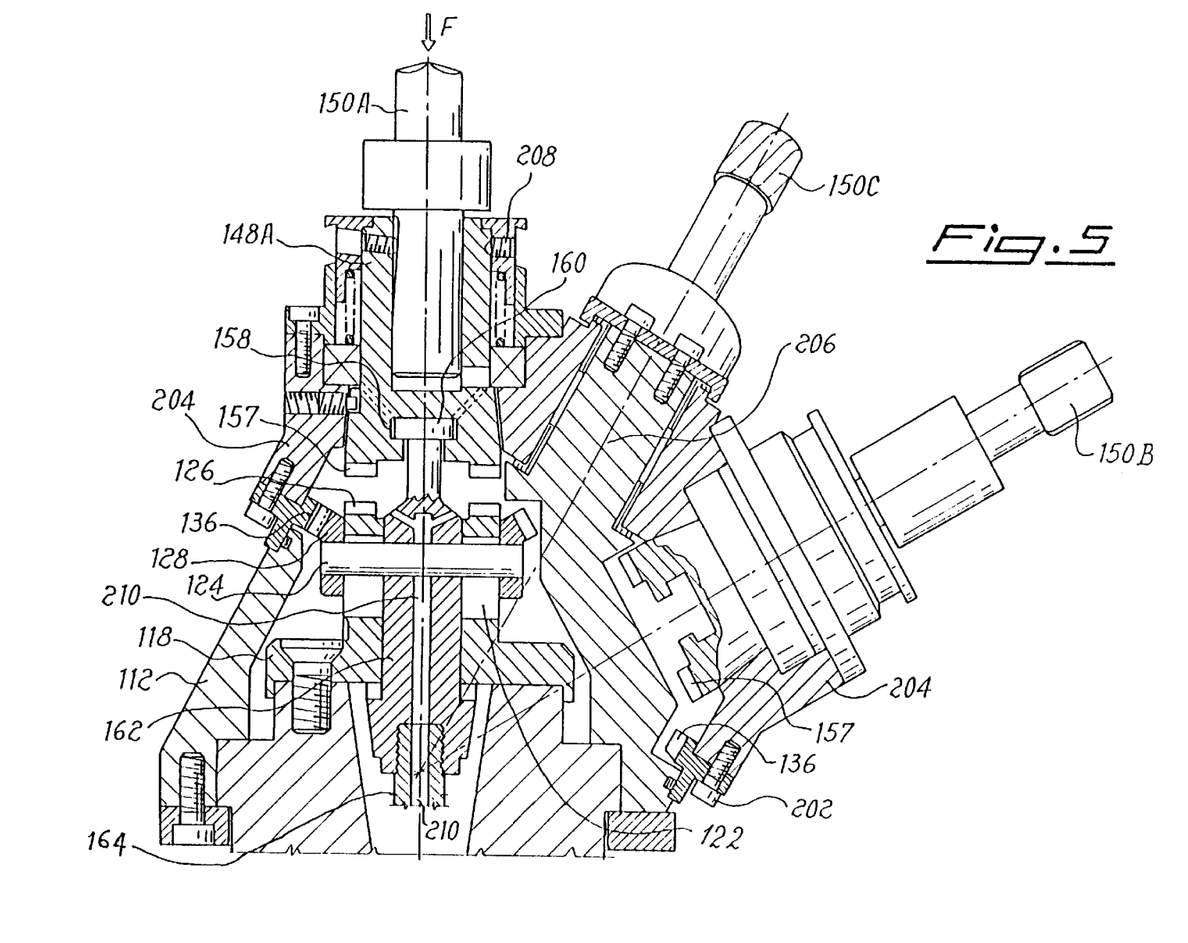
FIG. 5 is a view similar to FIG. 1 of a further embodiment of the device for change of tools in the disengaged operating condition.
Figure 5A:
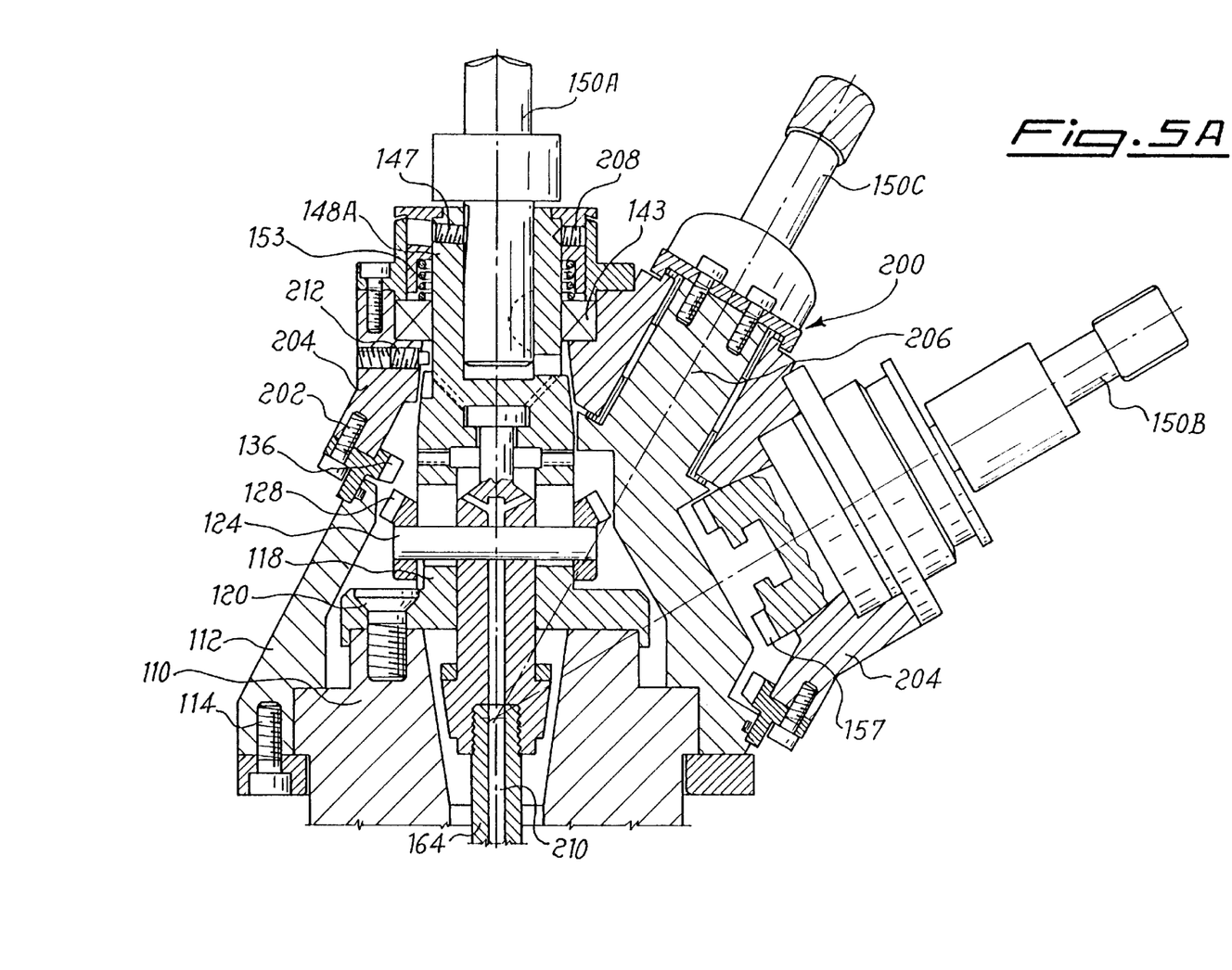
FIG. 5A is a view similar to FIG. 5 showing the device for change of tools in the locked condition.
Figure 5B:
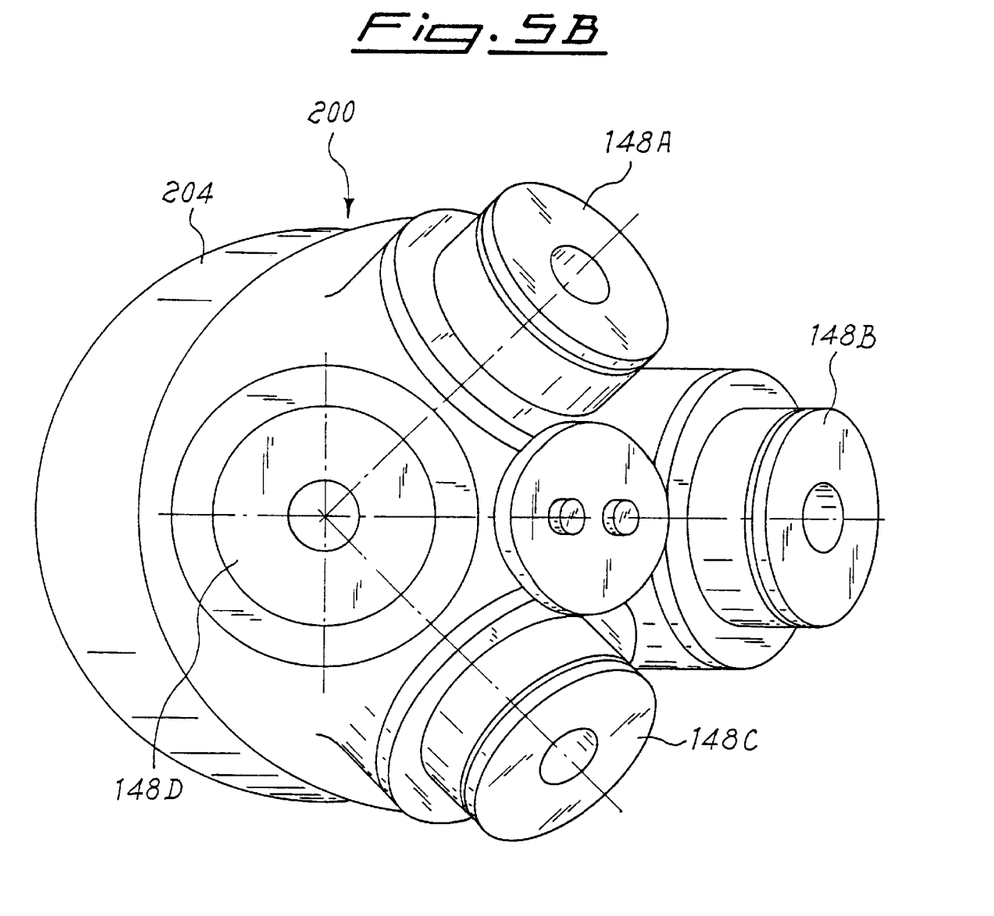
FIG. 5B is a front view, perpendicular to the axis of the spindle, of the tool-holder unit used in the embodiment in FIGS. 5 and 5A.

Finally, FIGS. 5, 5A and 5B show a further, preferred variation of the present invention, in which instead of the carriage 44 which is mobile according to an arc, there is provided a frusto-conical support pivotting around an axis which is inclined by a predetermined angle relative to the axis of the spindle of the operating unit.

In this case also, for the sake of clarity of description, the same numerals as for the same parts in the previous figures will be used, increased by 100.

Consequently on the end of the conventional operating unit there is mounted the connection 112 which is drilled internally, axially, and is attached by means of screws 114.

In this case also the end of the spindle ends in the conventional conical recess for fitting the tool-holder, with which recess in this case there is associated a reductor 118 which is drilled axially and aligned with the axis of the spindle 110, the reductor 118 being attached by screws 120.

Outside the body of the reductor 118 there is mounted a bevel gear 128, which slides along the reductor and is integral with a transverse pin 124, which in turn is vertically mobile relative to the reductor 118 by means of a slit 122, which has an appropriate depth, of at least twice the diameter of the pin 124.

Inside the axial aperture of the reductor 118, there is slidably accommodated a tie rod 162, which is integral with the lower end of a tie rod 164, which is controlled axially by control means associated with the operating unit and is integral with the spindle 110, so that it pivots therewith.

The body of the reductor 118 ends at the top in a ring gear 126 with frontal toothing, for example and preferably of the Hirth type.

At the upper end of the union 112, there is mounted a ring gear 136 which constitutes the base of a revolver tool-holder support, generally indicated 200 and shown in greater detail in FIG. 5B.

More specifically the ring gear 136 is attached by means of screws 202 to a support 204 which has a frusto-conical shape, the central axis 206 of which is inclined by a predetermined angle relative to the axis of the spindle 110, which angle is 30° in the depicted solution. In the embodiment depicted in FIG. 5B, four tool-holders 148 (A,B,C and D) are provided, disposed symmetrically and inclined by equal angles relative to the axis.

Each tool-holder 148 has an axial recess which can accommodate a tool 150 which is locked in a detachable manner, by means of a locking dowel 147.

The tool-holder 148 is locked in position relative to the cylindrical support 204, by means of a locking dowel 208 and the spring 153, and is maintained centred by means of bearings 143, which have sufficient clearance to avoid obstructions during the stage of change of tool and centring with respect to the spindle 110.

At the lower end the tool-holder 148 has a ring gear 157 with frontal toothing, also preferably of the Hirth type, which is aligned axially and can engage the ring gear 126.

In addition in the body of the tool-holder 148 there is a slot 158 in the shape of a T, which extends circularly in the cylindrical support and in particular in correspondence with the ideal conical surface defined by the axis of the support 204 and the axis of the spindle 110.

In this slot 158 is housed the head 160 of the tie rod 162 which is also in the shape of a T.

At last it should be noted that the tie rod 164 and the tie rod 162 have an axial duct 210 which permits supply under pressure of a lubricant, preferably in the form of a mixture of air and oil, in oreder to guarantee lubrication of the mechanical components of the device.

With reference to the device according to this embodiment for change of tools, the operation is considered to start from the locked condition shown in FIG. 5A, in which the ring gears 126 and 157 with frontal toothing are engaged with one another, and the tool-holder 148A is integral with and locked to the spindle 110, by means of which it is pivoted for execution of the mechanical processing related to the tool 150A mounted on the tool-holder.

By activating the tie rod 164 towards the exterior with respect to the spindle 110, the head 160 of the tie rod 162 is raised by the distance permitted by the depth of the slot 158 and the slit 122 of the reduction gear 118, such as to disengage the ring gear 157 from the ring gear 126 by moving it away from the latter.

Simultaneously the pin 124 is displaced upwards relative to the slit 122, drawing with it the bevel gear 128, which by this means engages with the ring gear 136 which is integral with the cylindrical support 204.

Pivoting by 180° of the spindle 110 gives rise (by means of an appropriate ratio between the gears 128 and 136) to pivoting by 90° of the support 204 around the axis of the support, which is guided in this pivoting by engagement between the head 160 of the tie rod 162 and the circular slot 158.

Further to this pivoting and in accordance with its direction, another tool-holder 148 is positioned in vertical alignment with the axis of the spindle 110.

At this time, for example through enabling from the numerical control unit, if the operating unit is of the numerical control type, the tie rod 164 is activated in the opposite direction, i.e. in the direction of approach to the operating unit, so that the tie rod 162 also is drawn in the same direction until the two Hirth rings 126 and 157 engage once more, and are thus connected integrally, and in particular the connection is rendered integral between the frontal toothing 157 of the tool-holder 148 and the reductor 118, so that a single body is obtained, comprising both the spindle of the operating unit and the tool 150.

In its axial displacement relative to the operating unit, the tie rod 164 activates a sensor (not shown since it is positioned in the rear part of the operating unit), which sensor permits pivoting of the spindle 110 and advance of the tube (i.e. the normal operation of the operating unit).

When the required mechanical processing is completed, the tube follows the normal return path, and simultaneously the spindle 110 decelerates until it stops, a process which takes place in a timed manner (i.e. with orientation which is always the same and predetermined).

When the tube and spindle have stopped and the tie rods 164 and 162 are activated in order to disengage the tool-holder which has carried out the mechanical processing, the tool-holder 148 is disengaged under the action of the spring 153 and the simultaneous thrust of the head 160 of the tie rod 162, in the manner described with respect to the reduction gear 118, and stops against the outer or end frusto-conical part of the support 204. In this condition a reference dowel 212 guarantees the timed condition of the tool-holder 148.

In the meanwhile, displacement of the tie rod 164, this time towards the exterior relative to the spindle 110, activates a sensor (also not shown) which permits the change of tool operation, i.e. that already described, which begins with 180° pivoting of the spindle 110.

At last it should be noticed that the different embodiment variations of the invention are described with respect to different numbers of tools to be changed for each operating unit.

However this should not be understood in a limiting sense, since for example in the embodiment variation in FIGS. 5, 5A and 5B, more than four tools can be positioned on the cylindrical support, provided of course that care is taken to change the angle at which the support pivots at each change of tool, and thus the toothing ratio between the bevel gear 128 and the ring gear 136.

Similarly in FIG. 5 the pin 124 has an annular groove in the position of the axial lubrication duct 210, owing to the obvious need to permit passage of the lubricant fluid to the end of the reductor 118.

At last, it should be noticed that amongst the major advantages of the present invention is the fact that the device for change of tools can be used with any operating unit, since attachment takes place by means of the conventional bevel gear provided at the end of the spindle of all operating units.

It will be appreciated that this solution can be replaced by others with the same functions, without departing from the context of the invention, which, as described, is subject to conceptually and mechanically equivalent modifications and variations.

We claim:

1. Device for changing tools of operating units in which a plurality, consisting of at least two tools (50,150) connected kinematically to the spindle (10,110) of an operating unit, characterized in that the device for changing tools comprises a support or carriage (44,204) on which there are mounted at least two tool-holders (48,148) with the corresponding tool (50,150) associated, the axis of at least one of these at least two tool-holder spindles being inclined at a pre-determined angle relative to the axis of the spindle (10,110) of the operating unit, means (28,30,36,42,128,136) controlled by the spindle of the operating unit in order to pivot a tool-holder selected from amongst the at least two tool-holders (48,148) by this predetermined angle in order to align it with the axis of the spindle (10) of the operating unit, and means (60,62,64,26,57,164,162,126,157) for engagement and disengagement in order to engage and disengage transmission of the pivoting motion between the spindle (10,110) of the operating unit and the tool-holder spindle (48,148) which is aligned with its axis, wherein the engagement and disengagement means consists of a pair of ring gears (26,57,126,157) with frontal toothing, provided on the top of a reductor (18,118) which is integral with the spindle (10,110) of the operating unit, and at the base of each of the at least two tool-holders (48,148) as well as of a tie rod (62,64,162,164) which is aligned axially with the reductor (18,118) and thus with the axis of the spindle (10,110) of the operating unit, and has a first end integral with the spindle of the operating unit and the other, outer end is accommodated in a recess (58,158) with a corresponding shape provided in the base of each of the at least two tool-holders (48,148), this recess extending parallel to a curvature which must be tracked and travelled by each of the at least two tool-holders, in order to go into this position aligned with the axis of the spindle of the operating unit, the tie rod (62,64, 162,164) being mobile axially such as to displace correspondingly the base of the at least two tool-holders instantaneously into the position aligned with the axis of the spindle of the operating unit, between a condition of mutual engagement of these two ring gears (26,57,126,157) with frontal toothing, and a disengaged condition.

2. Device for change of tools according to claim 1, characterized in that the curvature which must be tracked and travelled by each of the at least two tool-holders is a circumferential arc on the plane of which there lies the axis of the spindle (10) of the operating unit, and the centre of which lies on the same axis.

3. Device for change of tools according to claim 1, characterized in that the curvature which must be tracked and travelled by each of the at least two tool-holders is a circumferential arc on a plane which is inclined relative to the axis of the spindle (110) of the operative unit, of which one point lies on the same axis.

4. Device for change of tools according to claim 3, characterized in that the at least two tool-holders are mounted on a frusto-conical support (204) which pivots around an axis which is inclined by a predetermined angle relative to the axis of the spindle (110) of the operative unit, this angle being such that the pivoting of the pivoting support brings each of the tool-holders in succession into alignment with the axis of the spindle of the operating unit.

5. Device for change of tools according to claim 4, characterized in that there are at least four tool-holders.

6. Device for change of tools according to claim 4, characterized in that with the frusto-conical support (204) there is integral a ring gear (136) with internal toothing which pivots together with the frusto-conical support around the axis which is inclined by the predetermined angle, the reduction gear containing a longitudinal slot (122) in which there is accommodated transversely a pin (124) which is integral with a bevel gear (128), this pin also being integral with the tie rod (162), so that the displacement of the tie rod between the two positions of engagement and disengagement of the ring gears (126,157) with frontal toothing gives rise to disengagement and engagement of the bevel gear (128) with respect to the toothed ring (136).

7. Device for change of tools according to claim 4, characterized in that the tie rod (162) has a first end which is integral with a second tie rod (164) axially housed in the spindle (110) and axially mobile with respect to the latter, the other end (160) of the tie rod (162) being in the shape of a T and accommodated in a corresponding slot (158) provided in the frusto-conical support (204) and in the body of each tool-holder (148), and supported on a conical surface defined by the inclined axis of the frusto-conical support and the axis of the spindle (110) of this operating unit, the slot being parallel to the arc which each tool-holder (148) describes when the bevel gear (128) pivots in engagement with the ring gear (136).

8. Device for change of tools according to claim 7, characterized in that an axial duct provided in the tie rods (162,164) is in controlled communication with a lubricant fluid supply.

9. Device for change of tools for operating units according to claim 2, characterized in that it comprises a tool-holder carriage (44) on which there is mounted a plurality of tool-holders (48) with associated tools (50), this carriage being in the shape of an arc centred on the outer end of the spindle (10) and mobile in a controlled manner, in order to assume a plurality of positions, each of which corresponds to a condition of axial alignment of each of the tools with the spindle, a reduction gear component (18) which is mounted integrally with the outer end of the spindle, frontal toothing means (26,57) provided respectively on opposite surfaces of this reduction gear (18) and of the tool (48,50), and which can be mutually engaged on control, tie rod means (60,62)

to control this controlled engagement and disengagement of the frontal toothing means (26,57), and means for controlled displacement of the carriage from one to another of this plurality of positions, when the toothing means are mutually disengaged.

10. Device for change of tools according to claim 9, characterized in that the means for controlled displacement of the carriage consist of a kinematic chain (28,30) so that the pivoting of the spindle (10) by a predetermined angle is transmitted to a gear (40) engaged with a ring gear (42) which is integral with the carriage, this kinematic chain being activated when the tie rod is activated such as to disengage the frontal toothing means (26,57) from one another.

11. Device for change of tools according to claim 10, characterized in that the kinematic chain consists of a bevel gear (28) which is integral with a transverse pin (24) which in turn is attached transversely to a tie rod (62) which is attached at one end to a second tie rod (64) which is accommodated axially in the spindle (10) and is mobile axially along the spindle (10), the other end (60) of the tie rod (62) being in the shape of a T and accommodated in a corresponding slot (58) of a tool-holder component (48) with which a tool (50) is integral, the slot (58) extending in an arc along the entire length of the carriage (44), the reductor (18) containing an axial aperture in which the tie rod (62) slides, and a lateral aperture (22) of a depth such as to permit displacement of the pin (24) integrally with the tie rod (62), the bevel gear (28) being mounted outside the reductor (18) and in engagement with the pin (24), so that translation of the pin integrally with the tie rod gives rise to displacement of the bevel gear between a position engaged with the pinion (30) and a disengaged position.

12. Device for change of tools according to claims 11, characterized in that the ring gear (57) with frontal toothing is provided on the base part of the tool-holder (48), and the ring gear (26) with frontal toothing is provided on the upper surface of the reduction gear (18).

13. Device for change of tools according to claim 12, characterized in that the frontal toothing of the ring gears (26,57) is of the Hirth type.

14. Device for change of tools according to claim 11, characterized in that the displacement of the carriage (44) is guided by guide means (36,46,49), the tool-holder (48) is mounted in the carriage by means of loose-fitting bearings (43), and by a pin (52) fitted in a slot (56).

15. Device for change of tools according to claim 11, characterized in that sensor means (66,68,70) are provided to control pivoting of the spindle (10) for the change of tool-holder (48) and tool (50).

16. Device for change of tools according to claim 10, characterized in that three tools (50A,50B,50C) are provided, with corresponding tool-holders (48A,48B,48C), these tools being of the type suitable for a succession of cycle processing operations.

17. Device for change of tools according to claim 10, characterized in that the carriage (44) is displaced by means of a pressurised fluid which acts in a chamber which has a fixed wall and a mobile part, the latter being integral with the carriage.

18. Device for change of tools according to claim 17, characterized in that the chamber is divided into two cams which are disposed on both sides of the axis of the spindle (10), and two fixed walls (74,76) are provided which are integral with a connection (12) and two walls (78,80) are provided which are integral with the carriage (44), these fixed walls containing passages for supply or discharge of compressed air to or from the respective chambers (70,72).

19. Device for change of tools according to claim 17, characterized in that two tool-holders (48A,48B) and two tools (50A,50B) are provided.

* * * * *